United States Patent
Egami (10) Patent No.: US 6,700,386 B2
(45) Date of Patent: Mar. 2, 2004

(54) POWER DISTRIBUTION APPARATUS FOR A MOTOR VEHICLE

(75) Inventor: Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 10/022,615

(22) Filed: Dec. 20, 2001

(65) Prior Publication Data

US 2002/0084786 A1 Jul. 4, 2002

(30) Foreign Application Priority Data

Dec. 28, 2000 (JP) .......................... 2000-402716

(51) Int. Cl.$^7$ .................... G01R 31/00; H01H 31/02; H02G 3/00
(52) U.S. Cl. .................... 324/503; 324/537; 324/556; 307/10.1
(58) Field of Search ................. 324/503, 537, 324/555, 556; 307/10.1

(56) References Cited

U.S. PATENT DOCUMENTS

| | | | | |
|---|---|---|---|---|
| 4,639,609 A | * | 1/1987 | Floyd et al. ............... | 307/10.1 |
| 5,416,702 A | * | 5/1995 | Kitagawa et al. ........... | 701/36 |
| 5,845,221 A | * | 12/1998 | Hosokawa et al. ........ | 307/10.1 |
| 5,886,419 A | * | 3/1999 | Saito et al. ................ | 307/10.1 |
| 6,420,799 B1 | * | 7/2002 | Sakamoto et al. ......... | 307/10.1 |
| 6,465,908 B1 | * | 10/2002 | Karuppana et al. ....... | 307/10.1 |

FOREIGN PATENT DOCUMENTS

| | | |
|---|---|---|
| JP | A 9-76839 | 3/1997 |
| JP | A 9-312937 | 12/1997 |
| JP | A 11-91463 | 4/1999 |
| JP | A 2000-16199 | 1/2000 |
| JP | A 2000-23380 | 1/2000 |

* cited by examiner

Primary Examiner—N. Le
Assistant Examiner—Timothy J Dole
(74) Attorney, Agent, or Firm—Oliff & Berridge, PLC (57) ABSTRACT

If there is an error in the feeding system and the error condition allows the motor vehicle to run, the power to electric load systems having a low priority is cut off. If the error condition does not allow the motor vehicle to run, the power to all electric loads is cut off. If there is an error in an electric load system having a high priority, the power to all electric loads is cut off. If there is an error in an electric load system having a low priority, the power to this electric load is cut off.

13 Claims, 6 Drawing Sheets

| SYS ID | SYSs | ELS (EXAMPLE) | PRIORITY LEVEL | ALLOWABLE FLG | RQ PWR |
|---|---|---|---|---|---|
| 1 | BRAKE SYS | BRAKE LAMP | 1 | OFF | RP1 |
| 2 | SIGHT SECURING SYS | HEADLIGHT, WIPER | 1 | OFF | RP2 |
| 3 | STEERING SYS | STEERING, WINKER | 1 | OFF | RP3 |
| 4 | SAFETY SYS | SHEET BELT, AIR BAG | 1 | OFF | RP4 |
| 5 | DRIVING SYS | ENGINE, TRANSMISSION | 2 | ON | RP5 |
| 6 | PWR SOURCE SYS | ALTERNATOR, BATTERY | 2 | ON | RP6 |
| 7 | SUSPENSION SYS | E-CONTROLLED SUSPENSION | 3 | ON | RP7 |
| 8 | DRIVING ASSIST SYS | ABS, TRACTION CONT | 3 | ON | RP8 |
| 9 | DOOR SYS | PWR WINDOW DOOR LOCK | 3 | ON | RP9 |
| 10 | STARTING SYS | STARTER | 3 | ON | RP10 |
| 11 | INSTRUMENT SYS | SPEED METER, TACHOMETER | 4 | ON | RP11 |
| 12 | CLIMATE SYS | AIR COND, HEATER, FAN | 4 | ON | RP12 |
| 13 | ACCESSORIES | AUDIO, RADIO | 4 | ON | RP13 |

| SYS ID | ELS | PRIORITY LEVEL | ALLOWABLE FLAG | RELATION DATA |
|---|---|---|---|---|
| 13 | PWR AMP | 4 | ON | 13 |
| 14 | RAID IO | 5 | ON | 13 |
| 15 | CD | 5 | ON | 13 |

POWER DISTRIBUTION APPARATUS FOR A MOTOR VEHICLE

BACKGROUND OF THE INVENTION

1. Field of the Invention

This invention relates to an electrical power distribution apparatus for an motor vehicle.

2. Description of the Prior Art

A power distribution apparatus for a motor vehicle controls distribution of a power to respective electric loads in the motor vehicle. Japanese patent application provisional publication No. 2000-23380 discloses a power distribution apparatus for a motor vehicle which selectively distributes a power from a power supply to a plurality of power supply terminals. When there is an error at a portion downstream from the power supply terminal, the power supply terminal cuts off the power to the corresponding electric load, and when there is an error at a portion upstream from the power supply terminal, the power distributor controls supplying the power to all electric loads.

In this system, if there is an error upstream from respective power supply terminals, the power is cut off to all electric loads to secure the safety in the circuit. If there is an error at one electric load, the power supply terminal supplying the power to the electric load cuts off the power. This enables the power distribution apparatus to maintain supplying the power to other electric loads.

However, if an error in the power supplying side is detected, supplying the power is stopped to all electric loads, so that the motor vehicle cannot travel no longer though there is a possibility to run because there is a power left in a battery.

SUMMARY OF THE INVENTION

The aim of the present invention is to provide a superior power distribution apparatus.

According to the present invention, a first aspect of the present invention provides a power distribution apparatus for a motor vehicle having a plurality of electric loads, a power supply for supplying a power to said electric loads, and distribution control means for independently controlling distribution of said power to said electric loads, said distribution control means further including: storing means for storing priorities of said electric loads for classifying said electric loads into a plurality of groups; detection means for detecting an error in a power feeding system including said power supply and said distribution control means and detecting a condition that it is possible to partially distribute said power to said electric loads in the presence of said error; and control means for distributing said power to a portion of said groups of said electric loads having said priority which is relatively high and cutting off said power to remains of said groups of said electric loads having said priority which is relatively low when said detection means detects said condition.

According to the present invention, a second aspect of the present invention provides a power distribution apparatus based on the first aspect, wherein said storing means further stores class data for classifying said electric loads into an essential group and a non-essential group, said detection means further detects, in the presence of said error, a second condition that said error will make it impossible to run said motor vehicle and a third condition that said error allows said motor vehicle to run, and said control means cuts off said power to at least said essential group of said electric loads on the basis of said class data when said detection means detects said second condition and distributes said power to said essential group of said electric loads and cuts off said power to at least a portion of said non-essential group of electric loads on the basis of said class data when said detection means detects said third condition.

According to the present invention, a third aspect of the present invention provides a power distribution apparatus based on the second aspect, wherein said detection means further detects a present ability of feeding said power from said power feeding system, and said third condition is detected by detecting whether a total of powers required by said electric loads exceeds said present ability of said power.

According to the present invention, a fourth aspect of the present invention provides a power distribution apparatus based on the first aspect, further comprising: second detection means for detecting whether there is an electric load error in said electric loads and detecting said priority of said electric load having said electric load error; and second control means for cutting off said power to at least one of said groups of said electric loads having a high priority when said detected priority is higher than a reference and distributing said power to said groups of said electric loads having high priorities and cutting off said power to said detected electric load when said second detection means detects said electric load error and said detected priority is not higher than said reference.

According to the present invention, a fifth aspect of the present invention provides a power distribution apparatus based on the second aspect, wherein, at start up of said motor vehicle, said detection means detects said error and, in the presence of said error, detects said second condition and said third condition, and said control means cuts off said power to at least said essential group of said electric loads and alarms the operator on the basis of said class data when said detection means detects said second condition and distributes said power to said essential group of said electric loads and cuts off said power to at least a portion of said non-essential group of electric loads and alarms the operator on the basis of said class data when said detection means detects said third condition.

According to the present invention, a sixth aspect of the present invention provides a power distribution apparatus for a motor vehicle having a plurality of electric loads, a power supply for supplying a power to said electric loads, and distribution control means for independently controlling distribution of said power to said electric loads, said distribution control means further including: storing means for storing priorities of said electric loads for classifying said electric loads into a plurality of groups; detection means for detecting whether there is an error in said electric loads and, in the presence of said error, detecting said priority of said electric load having said error; and control means for cutting off said power to at least one of said groups of said electric loads having said priority higher than a reference when said detected priority is higher than said reference and distributing said power to said groups of said electric loads having said priorities higher than said reference and cutting off said power to said detected electric load when said detection means detects said error and said detected priority is not higher than said reference.

According to the present invention, a seventh aspect of the present invention provides a power distribution apparatus based on the sixth aspect, wherein said storing means stores class data for classifying said electric loads into an essential group and a non-essential group, said detection means further detects, in the presence of said error, whether said electric load having said error belongs to said essential group or non-essential group on the basis of said class data, and said control means cuts off said power to at least all of said electric loads in said essential group when said electric load having said error belongs to said essential group and cuts off said power to said electric load having said error when said electric load having said error belongs to said non-essential group.

According to the present invention, an eighth aspect of the present invention provides a power distribution apparatus based on the sixth aspect, wherein said control means further cuts off said power to one of said electric loads having said priority which is lower than said detected priority and having relation data indicating a relation with said detected electric load when said detected priority is not higher than said reference.

According to the present invention, a ninth aspect of the present invention provides a power distribution apparatus based on the sixth aspect, further comprising: second detection means for detecting a power feeding error in a power feeding system including said power supply and said distribution control means, and detecting a condition that it is possible to partially distribute said power to said electric loads in the presence of said power feeding error; and second control means for distributing said power to a portion of said groups of said electric loads having a higher priority and cutting off said power to remains of said groups of said electric loads having a lower priority when said second detection means detects said condition.

According to the present invention, a tenth aspect of the present invention provides a power distribution apparatus based on the seventh aspect, wherein, at start up of said motor vehicle, said detection means further detects, in the presence of said error, whether one of said electric loads having said error belongs to said essential group or non-essential group, and said control means cuts off said power to at least all of said electric loads in said essential group and alarms the operator on the basis of said class data when said electric load having said error belonging to said essential group and cuts off said power to said electric load having said error and alarms the operator when said electric load having said error belongs to said non-essential group.

According to the present invention, an eleventh aspect of the present invention provides a power distribution apparatus for a motor vehicle having a plurality of electric loads, a power supply for supplying a power to said electric loads, and distribution control means for independently controlling distribution of said power to said electric loads, said distribution control means further including: storing means for storing priorities of said electric loads for classifying said electric loads into a plurality of groups; first detection means for detecting an error in a power feeding system including said power supply and said distribution control means, and detecting a condition that it is possible to partially distribute said power to said electric loads in the presence of said error; second detection means for detecting a degree of said error; and control means for successively distributing said power to one of said groups of said electric loads in order of said priority on the basis of said detected degree.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
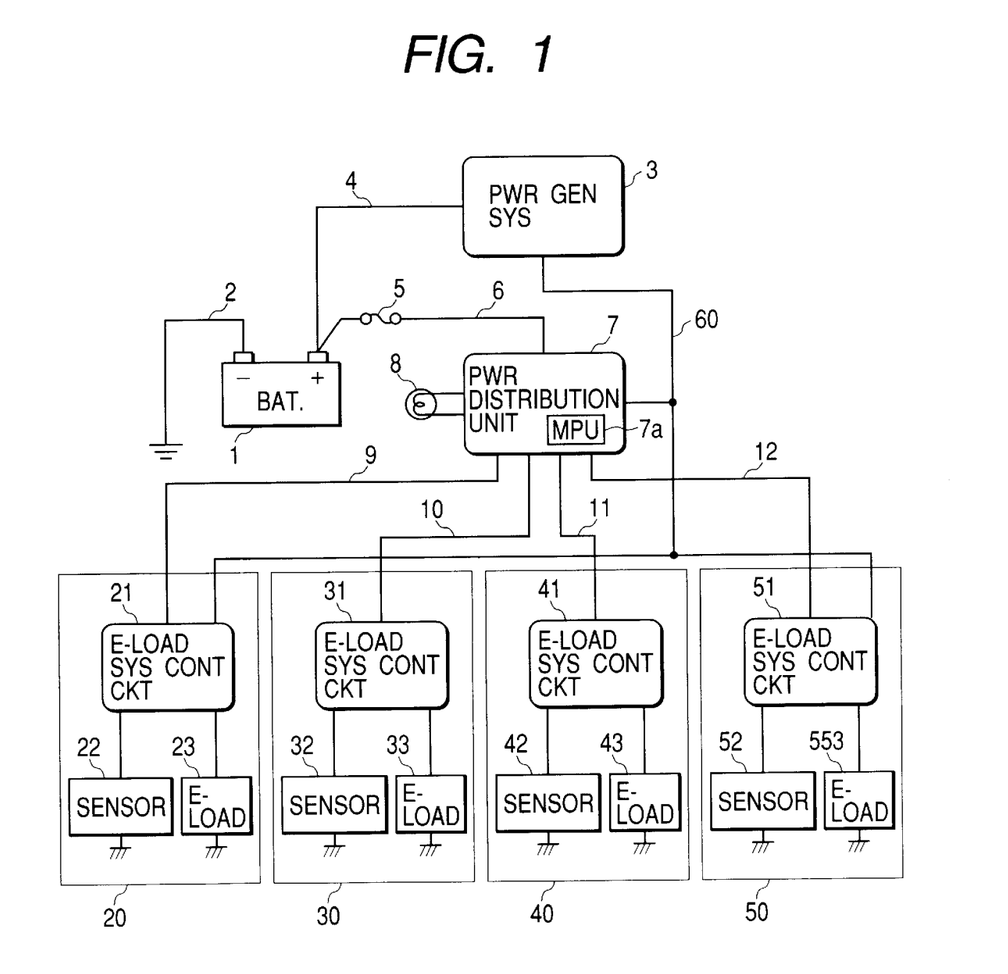
FIG. 1 is a block diagram of a power distribution apparatus for a motor vehicle according to an embodiment of the present invention.

Referring now to the drawings and more particularly to FIG. 1, the (electric) power distribution apparatus for a motor vehicle comprises a battery 1, a power generation system 3, a power distribution unit 7, and electric load systems (electric loads) 20 to 50. A negative terminal of the battery 1 is connected to the body earth of the motor vehicle through an earth cable 2. The positive terminal of the battery 1 is supplied with a power through a power cable 4 from the power generation system 3. The power generation system 3 comprises an alternator driven by the engine (not shown) of the motor vehicle. The power from the battery 1 or the power generation system 3 is supplied through a fusible rink 5 and a power cable 6 to the power distribution unit 7. The power distribution unit 7 distributes the power to respective electric load systems 20, 30, 40, and 50 through power cables 9 to 12.

The power distribution unit 7 controls a lamp 8 to inform the driver of an alarm (caution) A by flickering the lamp 8 and to inform the driver of an alarm B by continuously turning on the lamp 8.

The electric load system (ELS) 20 includes an electric load system control circuit 21, a sensor 22, and an electric load 23. In this embodiment, the electric load system 20 is an ABS unit, and the electric load system control circuit 21 is an ABS control circuit. The ABS unit 20 further includes a vehicle velocity sensor and an electromagnetic type of hydraulic actuator 23 as the sensor 22 and the electric load 23.

The electric load systems 30, 40, and 50 have substantially the same structure as the electric load system 20 in electric structure. That is, the electric load systems 30, 40, and 50 have electric load system control circuit 31, 41, and 51, sensors 32, 42, and 52 and electric loads 33, 43, and 53, respectively. In this embodiment, only electric load systems 30, 40, and 50 are shown. Actually, there are further various electric load systems in a motor vehicle.

The power generation system 3, the power distribution unit 7, and electric load systems 30, 40, and 50 are communicated with each other through communication cables 60.

The power distribution unit 7 comprises for example, a controller including a microprocessor 7*a* and switches for independently controlling supplying and cutting off the power to electric load systems 20, 30, 40, and 50.

The electric load systems 20, 30, 40, and 50 control feeding of the power to their electric loads 23, 33, 43, and 53 on the basis of the detection signals from the sensors 22, 32, 42, and 52 and command signals from a vehicle ECU (not shown), respectively.

As mentioned above, in this embodiment, the power distribution unit 7 can separately feed and cut off the power to respective electric load systems 20, 30, 40, and 50. Moreover, the electric load systems 20, 30, 40, and 50 can control feeding the power to their own electric loads, respectively. Therefore, in this embodiment the feeding system may include the power distribution unit 7 and the portion which is upstream from the power distribution unit 7. Alternatively, the feeding system may include the electric load systems 20, 30, 40, and 50 and the portion which is upstream from the electric load systems 20, 30, 40, and 50. In the case, the electric load system control circuit 21 controls supplying the power to its electrical load 23 as a most downstream feeding system.

DISTRIBUTION OPERATION

Figure 2:
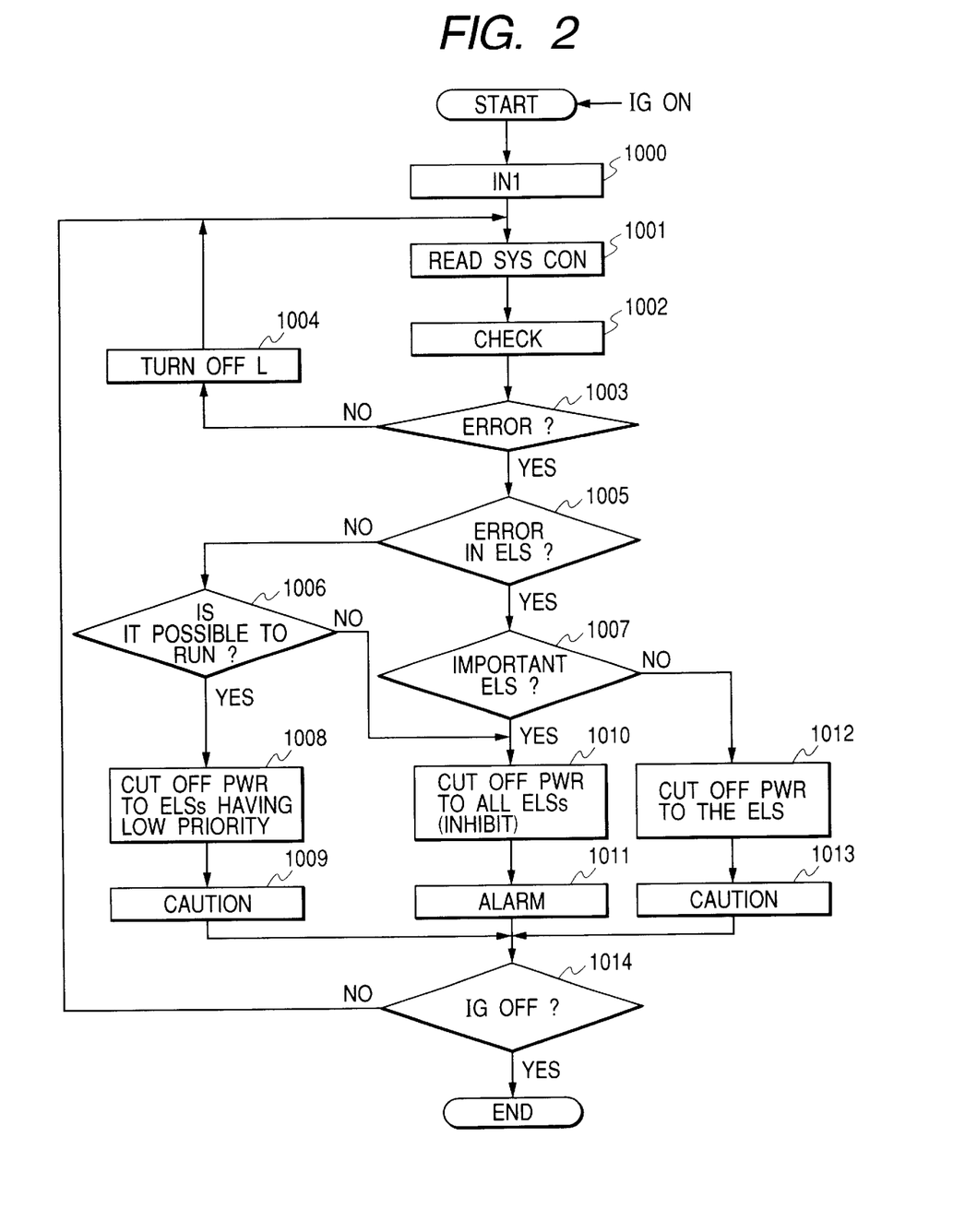
FIG. 2 depicts a flow chart of operation by a microprocessor in the power distribution unit shown in FIG. 1.

FIG. 2 depicts a flow chart of operation by a microprocessor 7a in the power distribution unit 7.

When a key switch of the motor vehicle is operated to turn on ignition, the power is supplied to the power distribution unit 7, and then, this program is executed.

In step 1000 the microprocessor 7a initializes its input and output ports and memory. Moreover, the microprocessor 7a establishes a communication standby condition and turns on the alarm lamp 8. During this, each of the electric load system control circuits 21, 31, 41, and 51 checks the condition of its own system and acquires its load condition data and repeatedly exchanges its conditional data with another unit to store conditional data of all electric load system control circuits 21, 31, 41, and 51. Then, if there is no trouble, all electric load system control circuits 21, 31, 41, and 51 have the same load conditional data set.

Similarly, the microprocessor in the power generation system 3 acquires its conditional data, that is, power generation condition. The microprocessor 7a in the power distribution unit 7 acquires conditional data of the battery 1, the cables 9 to 12 and its own condition, that is, battery conditional data and distribution conditional data.

Next, in step 1001, the microprocessor 7a in the power distribution unit 7 acquires (reads) conditional data from the power generation system 3, and all electric load system control circuits 21, 31, 41, and 51. During this, the acquired conditional data is subjected to a majority decision process to obtain correct conditional data to eliminate errors in communication.

Next, in step 1002, the microprocessor 7a of the power distribution unit 7 judges whether there is an error (failure) in the battery 1, the power generation system 3, the power distribution unit 7, and all electric load systems 20, 30, 40, and 50, and determines the location (the unit) where the error occurs.

In step 1003, the microprocessor 7a judges whether there is an error. If there is no error, processing proceeds to step 1004 where the microprocessor 7a turns off the lamp 8, and processing returns to step 1001.

In step 1003, if there is an error, processing proceeds to step 1005 where the microprocessor 7a further judges whether this error (failure) is in the electric load systems 20, 30, 40, and 50. If the error is not in the electric load systems 20, 30, 40, and 50, it can be judged that the error is in the feeding system. Here, in this embodiment, if there is an error in this system, but there is no error in the electric load systems 20, 30, 40, and 50, the error is judged to be in the feeding system. However, the error in the feeding system may be judged by detecting any error in the units other than the electric load systems, 20, 30, 40, and 50. Moreover, combination of these judgment processes may be used for double-check.

In step 1005, if the microprocessor 7a judges that the error is in the feeding system, processing proceeds to step 1006 and if the microprocessor 7a judges that the error in the electric load systems 20, 30, 40, and 50, processing proceeds to step 1007.

In step 1006, the microprocessor 7a further judges whether the error condition in the feeding system allows the motor vehicle to run from the acquired conditional data. For example, the microprocessor 7a judges whether the present power of power supplying of the power generation system 3 and the battery 1 is sufficient to run the motor vehicle (including the starting the engine).

If the error condition in the feeding system allows the running of the motor vehicle, processing proceeds to step 1008 where the microprocessor 7a stops feeding the power to the electric load systems having priority levels which are lower than a predetermined value (here, the electric load systems that are not essential for running the motor vehicle), wherein the power supplying to the electric load systems having high priorities is maintained. Next, in step 1009, the microprocessor 7a flickers the lamp 8 to give the driver indication of caution.

In step 1006, if the error in the feeding system is at the level that the motor vehicle cannot run, processing proceeds to step 1010 where the microprocessor 7a stops feeding the power to all the electric load systems to save the remaining power of power feeding to secure safety driving and continuously turn on the lamp 8 as an indication of alarm. Next, processing proceeds to step 1014.

In step 1005, when the microprocessor 7a judges that the error is in any of the electric load systems 20, 30, 40, and 50, the microprocessor 7a judges whether the electric load system having the error is essential (important) for running in step 1007. If the electric load is essential for running, the microprocessor 7a judges that the further running is impossible and stops feeding the power to all electric load systems to keep the remaining feeding power in the feeding system to secure safety and continuously turn on the lamp 8 in step 1011. Next processing proceeds to step 1014.

In step 1007, the electric load system having the error is not essential for running, the microprocessor 7a stops feeding the power only to the electric load system which is judged to have the error, and flickers the lamp 8 as an indication of caution in step 1013. Next, processing proceeds to step 1014.

In step 1014, the microprocessor 7a checks whether the ignition switch is turned off. If the ignition switch is not turned off in step 1014, processing returns to step 1001. If the ignition switch is turned off in step 1014, processing ends. As mentioned above, if there is an error in the feeding system and the error condition allows the motor vehicle to run, the power to electric load systems having a low priority is cut off. If the error condition does not allow the motor vehicle to run, the power to all electric loads is cut off. If there is an error in an electric load system having a high priority, the power to all electric loads is cut off. If there is an error in an electric load system having a low priority, the power to this electric load is cut off.

The distribution apparatus according to the embodiment allows the motor vehicle to run with saving of the power consumption unrelated to running of the vehicle when the error is in the feeding system, and the error condition allows the vehicle to run. If the error condition does not allow the motor vehicle to run, stopping supplying the power to respective electric load systems 20, 30, 40, and 50 prevents useless power consumption. If the error is in the electric load system which is not essential for running, the distribution apparatus stops supplying to the power only to the electric load system having the error to allow the motor vehicle to run. Moreover, if the error is in the electric load system which is essential for running, the distribution apparatus stops supplying the power to respective electric load systems 20, 30, 40, and 50 to prevent useless power consumption. Therefore, the performance of running during an error can be improved.

Figure 3:
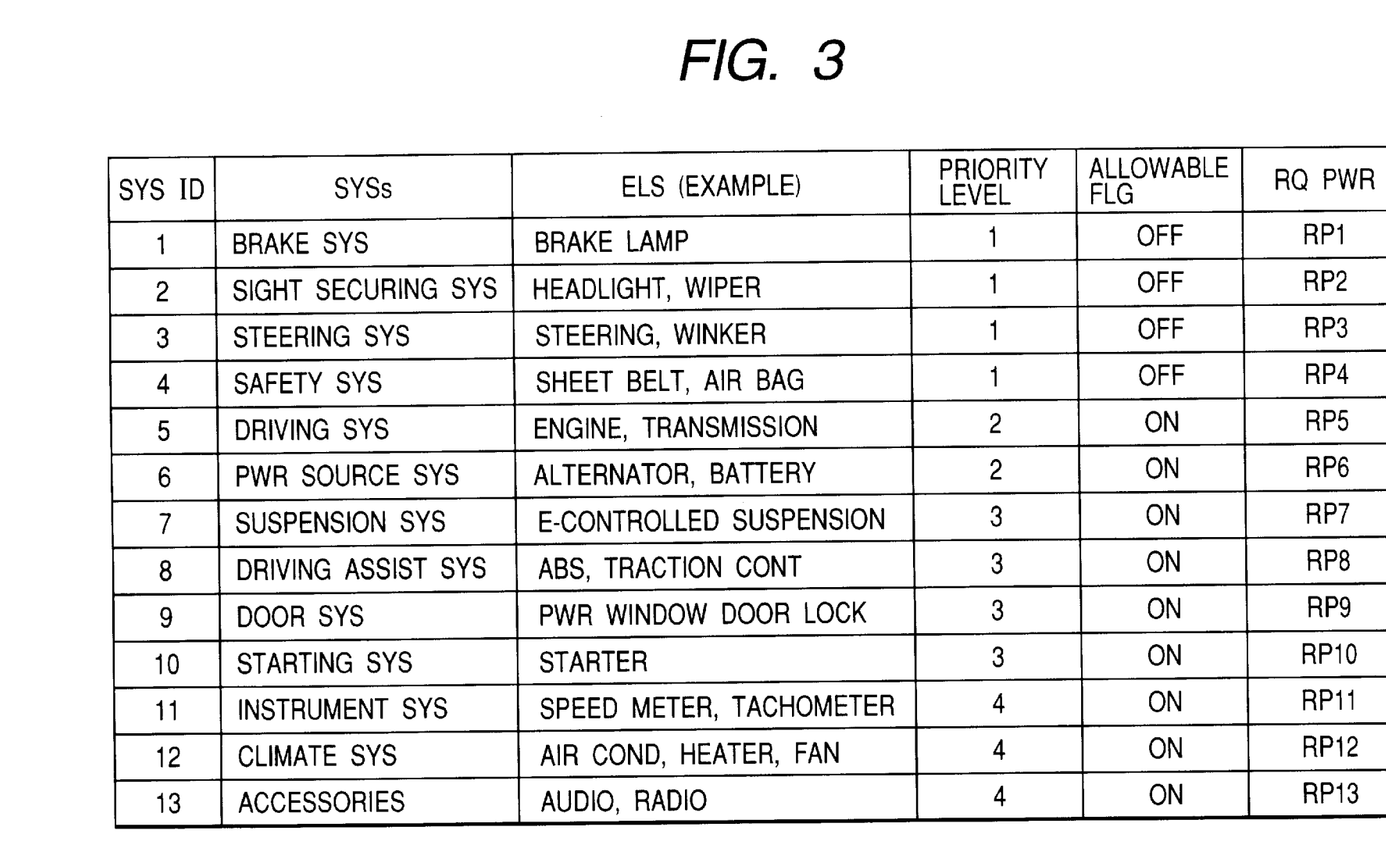
FIG. 3 is a table according to this embodiment showing relation between the respective systems and their corresponding data.

FIG. 3 is a table according to this embodiment showing relation between the respective systems and the priority levels and running enable flags. In FIG. 3, the electric load systems which are essential for running of the motor vehicle have a priority level of 1 (highest), and the electric load systems which are not essential for running have levels two to four.

If an error occurs in the system having the running allowable flag (ON), the distribution apparatus allows the motor vehicle to run, and if an error occurs in the system without the running allowable flag (OFF), the distribution apparatus inhibits the motor vehicle from running.

As mentioned above, the microprocessor 7a stores priorities of the electric loads for classifying the electric loads into a plurality of groups. At startup of the motor vehicle or during traveling, the microprocessor 7a detects an error in a power feeding system including the power supply (1, 3) and the distribution control unit 7, and detects a condition that it is possible to partially distribute the power to the electric loads 20–50 in the presence of the error. Then, the microprocessor 7a distributes the power to a portion of the groups of the electric loads having the priority which is relatively high (higher than a reference value) and cutting off the power to remains of the groups of the electric loads having the priority which is relatively low (not higher than the reference value) when the condition is detected.

Moreover, the microprocessor 7a further stores allowable flag (class data, a kind of priority data) for classifying the electric loads into an essential group (allowable flag=OFF) and a non-essential group (allowable flag=ON). In the presence of the error in the power feeding system, the microprocessor 7a further detects a second condition that the error will make it impossible to run the motor vehicle and a third condition that the error allows the motor vehicle to run. Then, the microprocessor 7a cuts off the power to at least the essential group of the electric loads on the basis of the class data when the microprocessor 7a detects the second condition and keeps or starts to distribute the power to the essential group of the electric loads and cuts off the power to at least a portion of the non-essential group of electric loads on the basis of the class data when the detection means detects the third condition.

Figure 4:
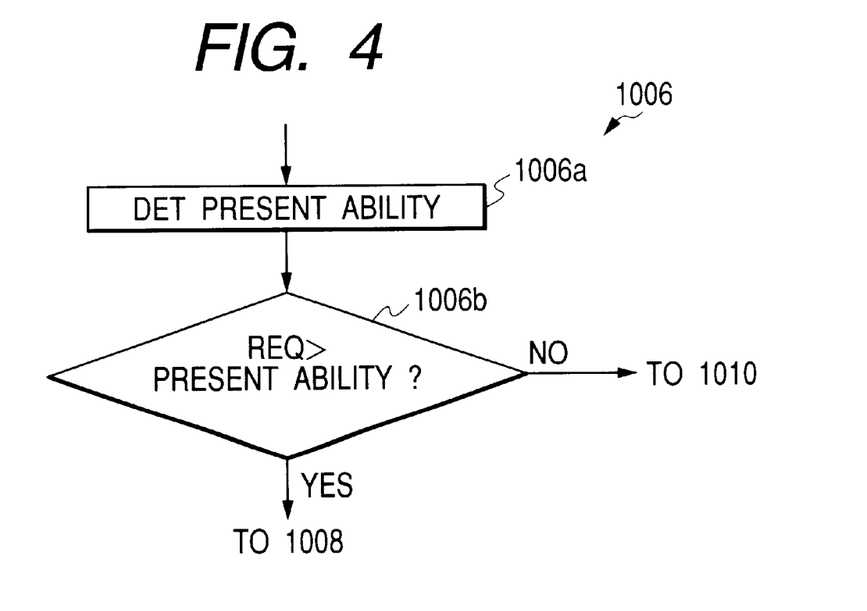
FIG. 4 depicts a partial flow chart illustrating a detailed operation in step 1006 shown in FIG. 2.

FIG. 4 depicts a partial flow chart illustrating a detailed operation in step 1006.

In step 1006a, the microprocessor 7a further detects a present ability of feeding the power from the power feeding system. The third condition is detected by detecting whether a total of powers required by the electric loads exceeds the present ability of the power in step 1006b.

Furthermore, the microprocessor 7a detects whether there is an electric load error in the electric loads and detects the priority of the electric load having the error. When the detected priority is higher than the reference, that is, the electric load is important, in step 1007, the microprocessor 7a cuts off the power to at least one of the groups of the electric loads having the priority higher than a reference in step 1010. Moreover, the microprocessor 7a distributes the power to the groups of the electric loads having the priorities higher than the reference and cuts off the power to a most downstream feeding system including the detected electric load when the error is detected and the detected priority is not higher than the reference in step 1012.

Figure 5:
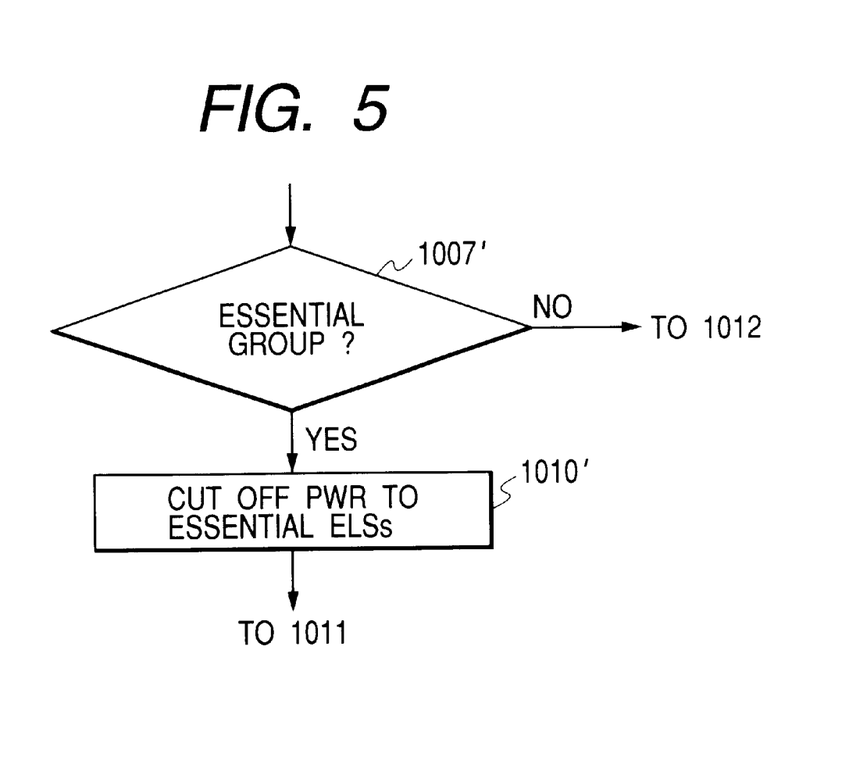
FIG. 5 depicts a partial flow chart illustrating a modified operation of steps 1007 and step 1010 in FIG. 2.

FIG. 5 depicts a partial flow chart illustrating a modified operation of steps 1007 and step 1010. In the presence of the electric load error, the microprocessor 7a further detects whether the electric load having the error belongs to the essential group or non-essential group on the basis of the allowable flag (class data) in step 1007'. When the electric load having the error belongs to the essential group, the microprocessor 7a cuts off the power to at least all of the electric loads in the essential group in step 1010'. When the electric load having the error belongs to the non-essential group, the microprocessor 7a cuts off the power to the power to the electric load having the error in step 1012.

Figure 6:
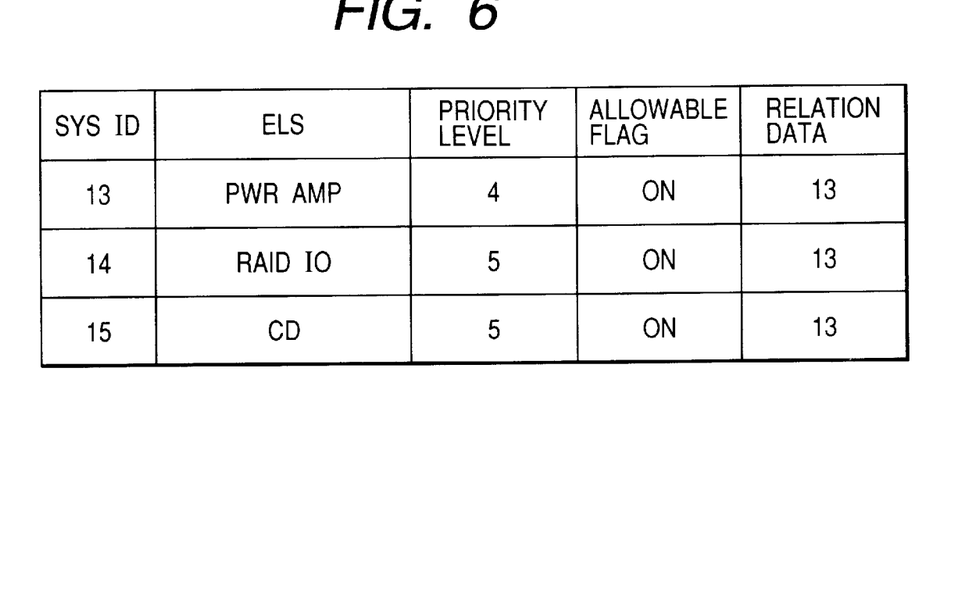
FIG. 6 is a partial table of data of electric loads for modification of step 1012 in FIG. 2.
Figure 7:
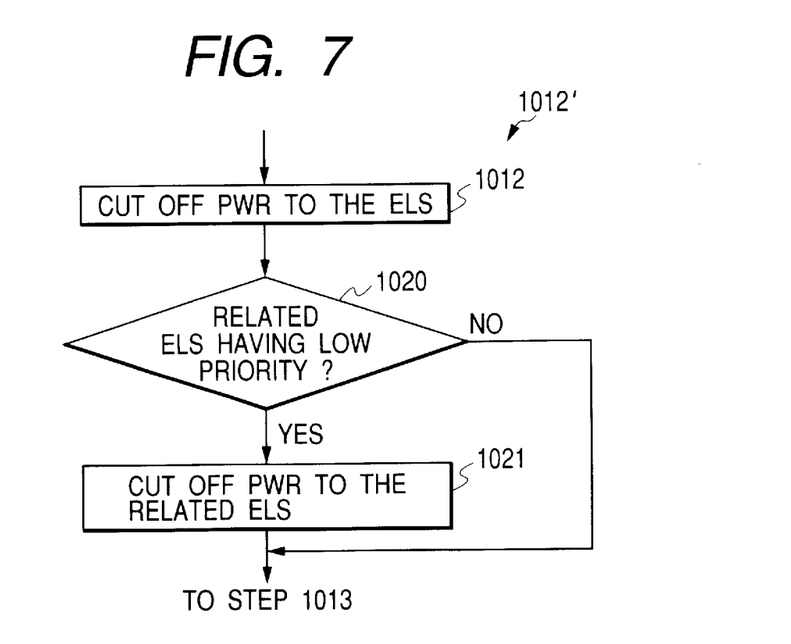
FIG. 7 depicts a partial flow chart illustrating operation of a modification of step 1012 in FIG. 2.

FIG. 6 is a partial table of data of electric loads for modification of step 1012. FIG. 7 depicts a partial flow chart illustrating operation of a modification of step 1012.

The microprocessor 7a stores the data shown in FIG. 6. A power amplifier having a system ID of 13 as an electrical load has a priority level of four, allowable flag=ON and relation data of 13. A radio receiver having a system ID of 14 as an electrical load has a priority level of five, allowable flag=ON, and relation data of 13. Similarly, a CD player having a system ID of 15 as an electrical load has a priority level of five, allowable flag=ON and relation data of 13. If the power amplifer has a trouble, the radio receiver and a CD player using the power amplifier cannot be used. Then, if an electrical load having relation data has a trouble, the microprocessor 7a cuts off the power to the electric load (the power amplifier), and checks whether there is any related electric load having a priority level which is lower than that of the electric load having the trouble (error) in step 1020. If there is the related electric load, the microprocessor 7a further cuts off the power to the related electric load (radio receiver, CD player) in step 1021, and processing proceeds to step 1013. If there is no related electric load in step 1020, processing directly proceeds to step 1013.

In the above-mentioned embodiment, in step 1008, the microprocessor 7a stops feeding the power to the electric systems having priority levels which are lower than a predetermined value (priority level value higher than one), but supplying the power only to electric load systems which are essential for running of the motor vehicle. However, if the error is in the feeding system and the error condition allows the motor vehicle to run, there are hard and light cases regarding the error. If the error is light, the relaxation of reference (threshold) for feeding the power allows the motor vehicle to run to some extent.

Then, the microprocessor 7a further detects the degree of the error in the feeding system if the error condition allows the motor vehicle to run. Next, the microprocessor 7a supplies the power to electric load systems in order of priority. That is, if the error in the feeding system is lightest, the microprocessor 7*a* stops feeding the power only to the electric load system having the lowest priority.

This operation prevents disadvantageous operation that the motor vehicle is driven in the worst condition though there is a sufficient power for feeding to the electric load systems which are not essential in addition to the power to the essential electric load systems.

Figure 8:
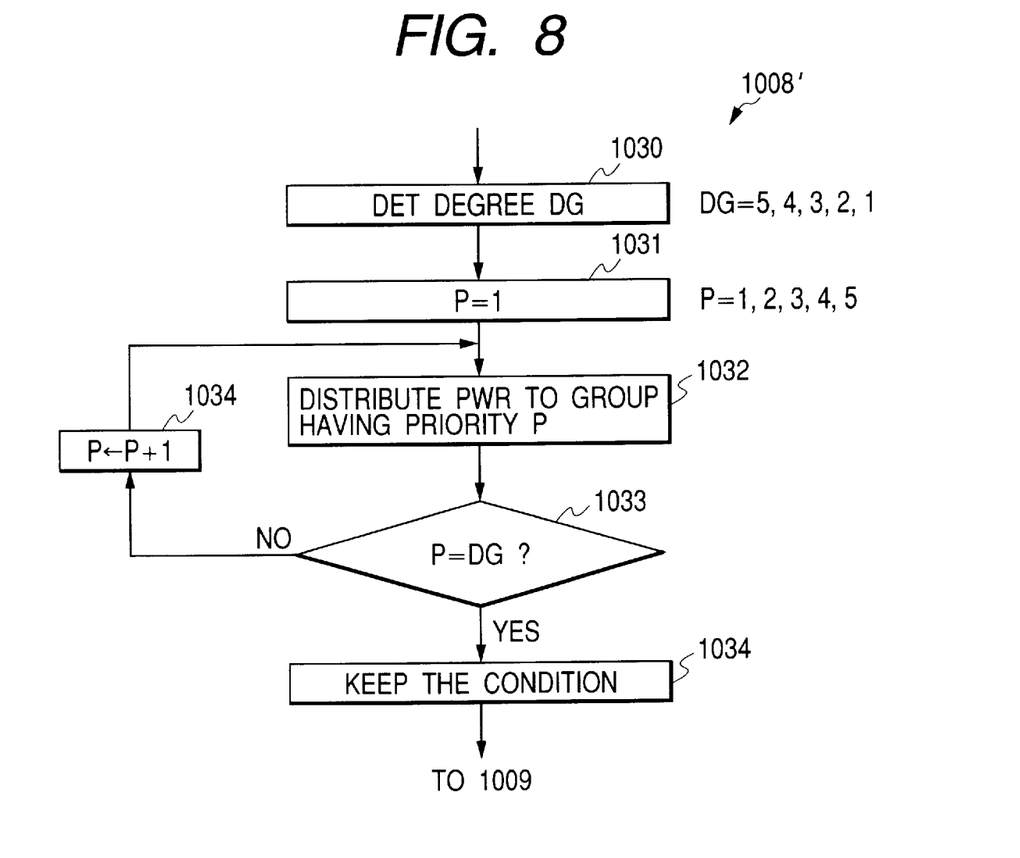
FIG. 8 depicts a partial flow chart of this modification of step 1008.

FIG. 8 depicts a partial flow chart of this modification of step 1008.

The microprocessor 7*a* detects an error in a power feeding system including the power supply and the power distribution control unit 7, and detecting a condition that it is possible to partially distribute the power to the electric loads in the presence of the error in steps 1005 and 1006. If it is possible to partially distribute the power to the electric loads, processing proceeds to step 1030.

In step 1030, the microprocessor 7*a* detects a degree of the error, wherein the lightest error has the degree value DG of five which decrease with increase in the degree of the error. The heaviest error corresponds the degree value DG of one.

In the next step 1031, the microprocessor 7*a* sets one to the priority level value. In the following step 1032, the microprocessor 7*a* distributes the power to the group of electric loads having the priority level value P.

In step 1033 if P≠DG, processing proceeds to step 1034, where P←P+1. Next, the microprocessor 7*a* distributes power to the group of the electric loads having the priority P. This is repeated until P=DG in step 1033. If P=DG in step 1033, the microprocessor 7*a* keeps this condition.

More specifically, at first, the microprocessor 7*a* distributes the power to the group of electric loads having the priority level of one. If the P≠DG in step 1033, the microprocessor 7*a* further distributes the power to the group of the electric loads having the priority level of two. Here, it is assumed that the detected degree value is two (considerably heavy trouble), the microprocessor 7*a* keeps this condition in step 1034.

What is claimed is:

1. A power distribution apparatus for a motor vehicle having a plurality of electric loads, a power supply for supplying a power to said electric loads, and distribution control means for independently controlling distribution of said power to said electric loads, said distribution control means further comprising:

storing means for storing priorities of said electric loads for classifying said electric loads into a plurality of groups;

detection means for detecting an error in a power feeding system including said power supply and said distribution control means and detecting a condition that it is possible to partially distribute said power to said electric loads in the presence of said error; and control means for distributing said power to a portion of said groups of said electric loads having said priority which is relatively high and cutting off said power to remainder of said groups of said electric loads having said priority which is relatively low when said detection means detects said condition, wherein said storing means further stores class data for classifying said electric loads into an essential group and a non-essential group, said detection means further detects, in the presence of said error, a second condition that said error will make it impossible to run said motor vehicle and a third condition that said error allows said motor vehicle to run, and said control means cuts off said power to at least said essential group of said electric loads on the basis of said class data when said detection means detects said second condition and distributes said power to said essential group of said electric loads and cuts off said power to at least a portion of said non-essential group of electric loads on the basis of said class data when said detection means detects said third condition.

2. The power distribution apparatus as claimed in claim 1, wherein said detection means further detects a present ability of feeding said power from said power feeding system, and said third condition is detected by detecting whether a total of powers required by said electric loads exceeds said present ability of said power.

3. The power distribution apparatus as claimed in claim 1, further comprising:

second detection means for detecting whether there is an electric load error in said electric loads and detecting said priority of said electric load having said electric load error; and second control means for cutting off said power to at least one of said groups of said electric loads having a high priority when said detected priority is higher than a reference and distributing said power to said groups of said electric loads having high priorities and cutting off said power to said detected electric load when said second detection means detects said electric load error and said detected priority is not higher than said reference.

4. The power distribution apparatus as claimed in claim 3, wherein said second control means cuts off power to said electric load on which the error is detected in the second detection means, and cuts off power to said electric leads in said group having the high priority when said detected priority is higher than the reference.

5. The power distribution apparatus as claimed in claim 1, wherein, at start up of said motor vehicle, said detection means detects said error and, in the presence of said error, detects said second condition and said third condition, and said control means cuts off said power to at least said essential group of said electric loads and alarms the operator on the basis of said class data when said detection means detects said second condition and distributes said power to said essential group of said electric loads and cuts off said power to at least a portion of said non-essential group of electric loads and alarms the operator on the basis of said class data when said detection means detects said third condition.

6. The power distribution apparatus as claimed in claim 1, wherein said non-essential group includes said electric loads, and said essential group includes said electric loads that are more important to allow the motor vehicle to run than said electric loads in said non-essential group.

7. A power distribution apparatus for a motor vehicle having a plurality of electric loads, a power supply for supplying a power to said electric loads, and distribution control means for independently controlling distribution of said power to said electric loads, said distribution control means further comprising:

storing means for storing priorities of said electric loads for classifying said electric loads into a plurality of groups;

detection means for detecting whether there is an error in said electric loads and, in the presence of said error, detecting said priority of said electric load having said error; and control means for cutting off said power to at least one of said groups of said electric loads having said priority higher than a reference when said detected priority is higher than said reference and distributing said power to said groups of said electric loads having said priorities higher than said reference and cutting off said power to said detected electric load when said detection means detects said error and said detected priority is not higher than said reference, wherein said storing means stores class data for classifying said electric loads into an essential group and a non-essential group, said detection means further detects, in the presence of said error, whether said electric load having said error belongs to said essential group or non-essential group on the basis of said class data, and said control means cuts off said power to at least all of said electric loads in said essential group when said electric load having said error belongs to said essential group and cuts off said power to said electric load having said error when said electric load having said error belongs to said non-essential group.

8. The power distribution apparatus as claimed in claim 7, wherein said control means further cuts off said power to one of said electric load having said priority which is lower than said detected priority and having relation data indicating a relation with said detected electric load when said detected priority is not higher than said reference.

9. The power distribution apparatus as claimed in claim 7, further comprising:
second detection means for detecting a power feeding error in a power feeding system including said power supply and said distribution control means, and detecting a condition that it is possible to partially distribute said power to said electric loads in the presence of said power feeding error; and
second control means for distributing said power to a portion of said groups of said electric loads having a higher priority and cutting off said power to remains of said groups of said electric loads having a lower priority when said second detection means detects said condition.

10. The power distribution apparatus as claimed in claim 9, wherein said second control means distributes power to a portion of said groups of said electric loads having a higher priority in a predetermined range, and cuts off power to all of said groups of said electric loads having a lower priority out of said predetermined range when said second detection means detects said condition.

11. The power distribution apparatus as claimed in claim 7, wherein, at start up of said motor vehicle, said detection means further detects, in the presence of said error, whether one of said electric loads having said error belongs to said essential group or non-essential group on the basis of said class data, and said control means cuts off said power to at least all of said electric loads in said essential group and alarms the operator on the basis of said class data when said electric load having said error belonging to said essential group and cuts off said power to said electric load having said error and alarms the operator on the basis of said class data when said electric load having said error belongs to said non-essential group.

12. The power distribution apparatus as claimed in claim 7, wherein said non-essential group includes said electric loads, and said essential group includes said electric loads that are more important to allow the motor vehicle to run than said electric loads in said non-essential group.

13. The power distribution apparatus as claimed in claim 7, wherein said second control means cuts off power to said electric load on which the error is detected in the second detection means, and cuts off power to said electric leads in said group having the high priority when said detected priority is higher than the reference.

* * * * *